W. B. OSBORNE.
GAS WASHER.
APPLICATION FILED JAN. 27, 1913.

1,094,466.

Patented Apr. 28, 1914.
3 SHEETS—SHEET 1.

W. B. OSBORNE.
GAS WASHER.
APPLICATION FILED JAN. 27, 1913.

1,094,466.

Patented Apr. 28, 1914.

3 SHEETS—SHEET 3.

WITNESSES

INVENTOR

UNITED STATES PATENT OFFICE.

WILLARD B. OSBORNE, OF SEWICKLEY, PENNSYLVANIA, ASSIGNOR TO RITER-CONLEY MANUFACTURING COMPANY, OF PITTSBURGH, PENNSYLVANIA, A CORPORATION OF NEW JERSEY.

GAS-WASHER.

1,094,466.  Specification of Letters Patent.  Patented Apr. 28, 1914.

Application filed January 27, 1913. Serial No. 744,372.

*To all whom it may concern:*

Be it known that I, WILLARD B. OSBORNE, of Sewickley, in the county of Allegheny and State of Pennsylvania, have invented certain new and useful Improvements in Gas-Washers, of which the following is a specification.

The prime object of the present invention is to provide a new and improved gas washer designed for use in connection with purifying gas.

Figure 1:
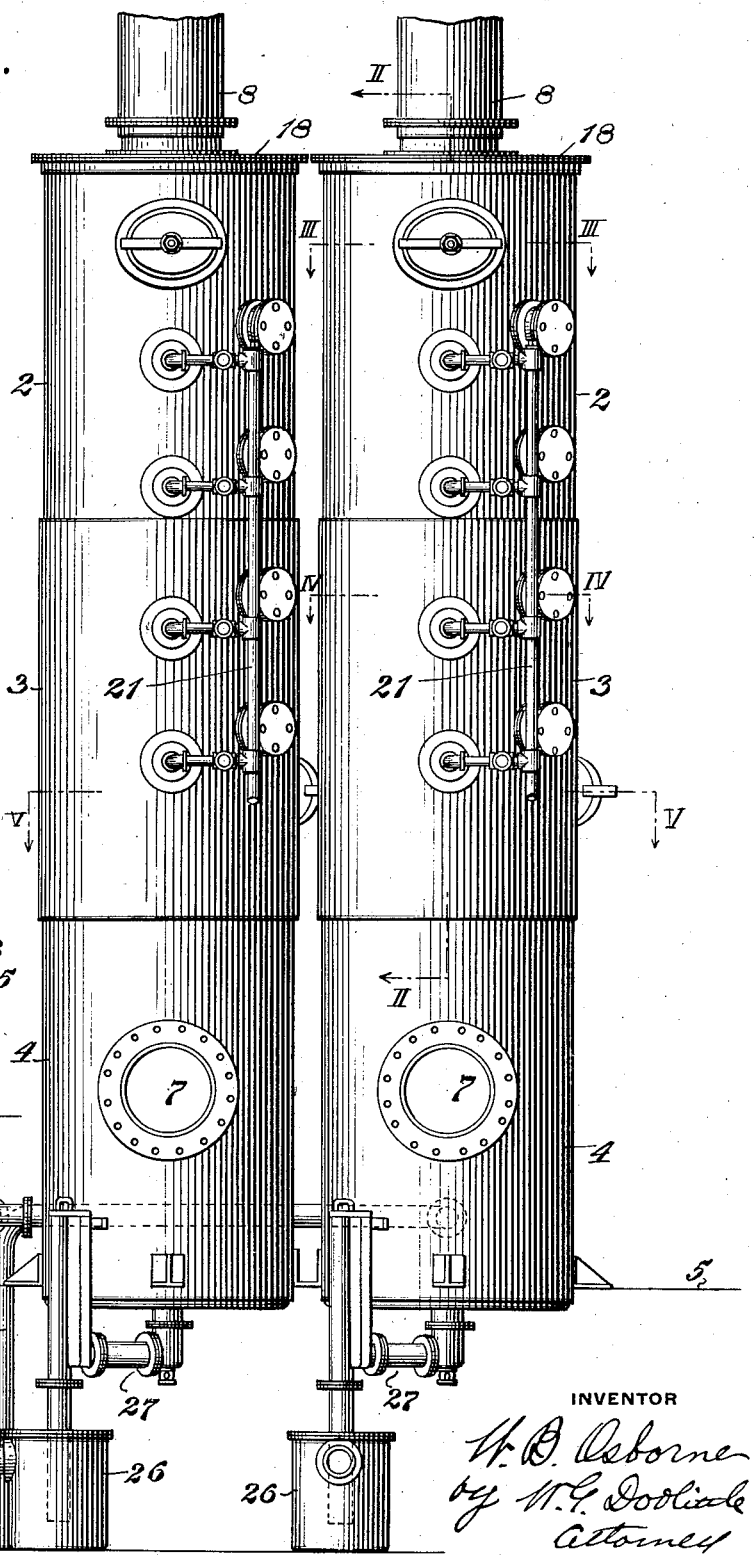
Figure 2:
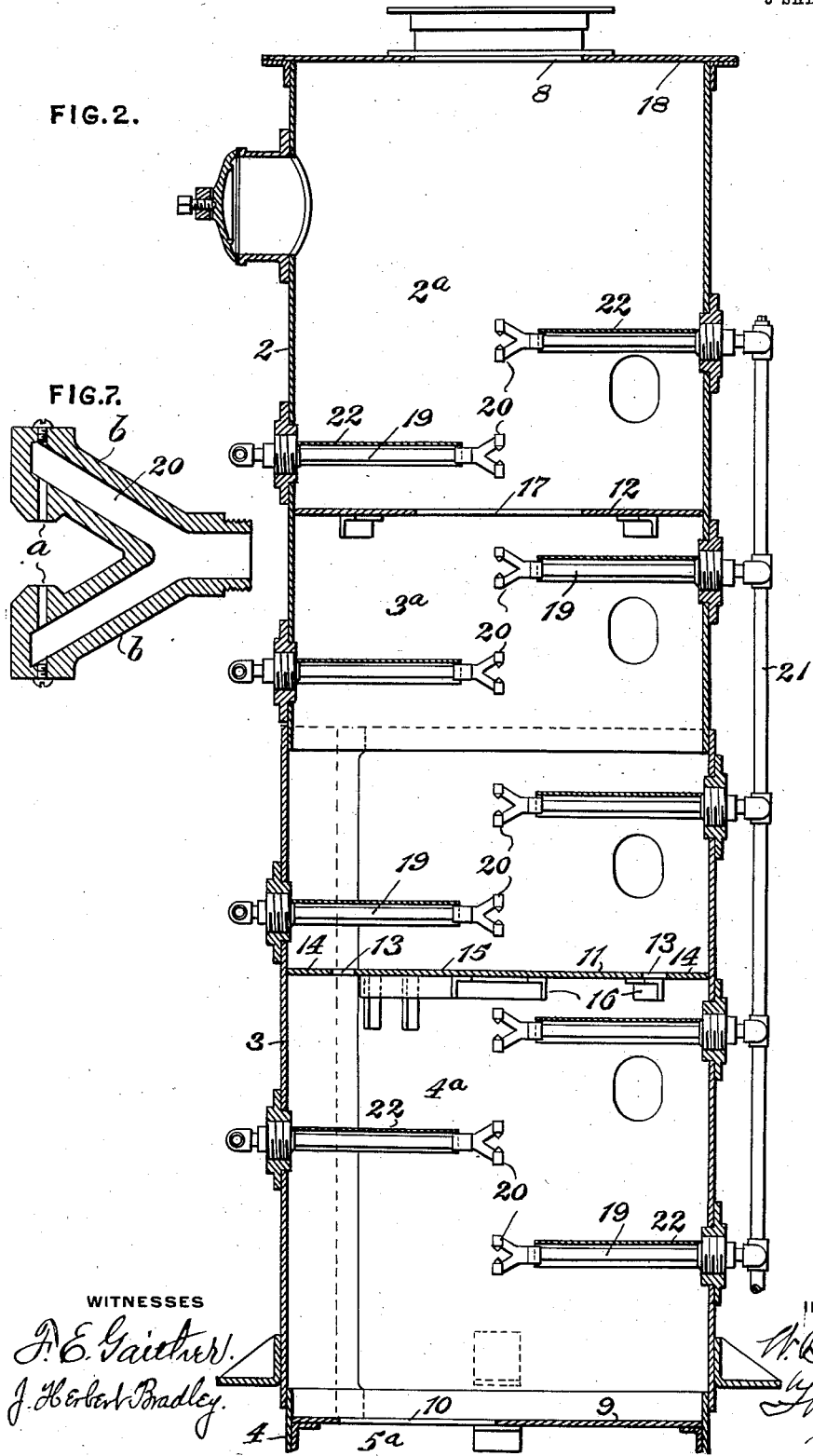
Figure 3:
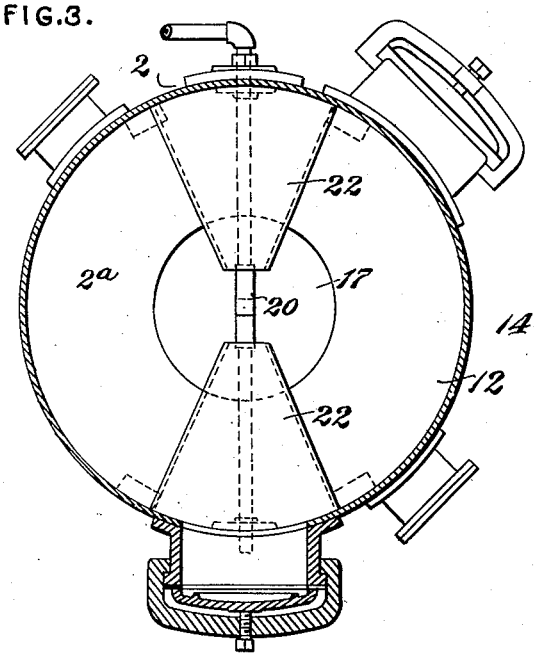
Figure 4:
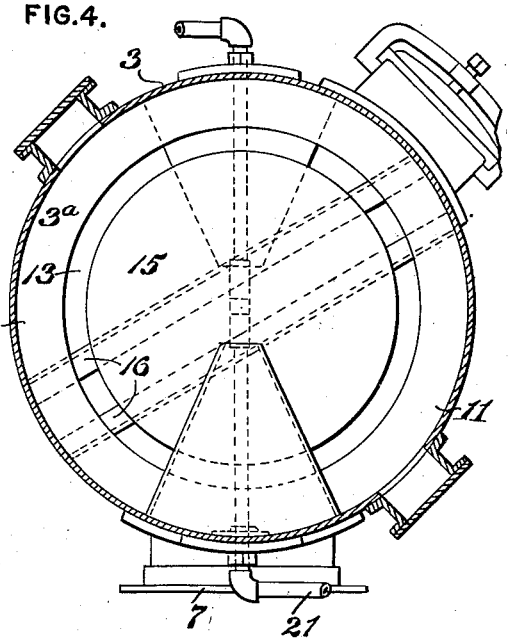
Figure 5:
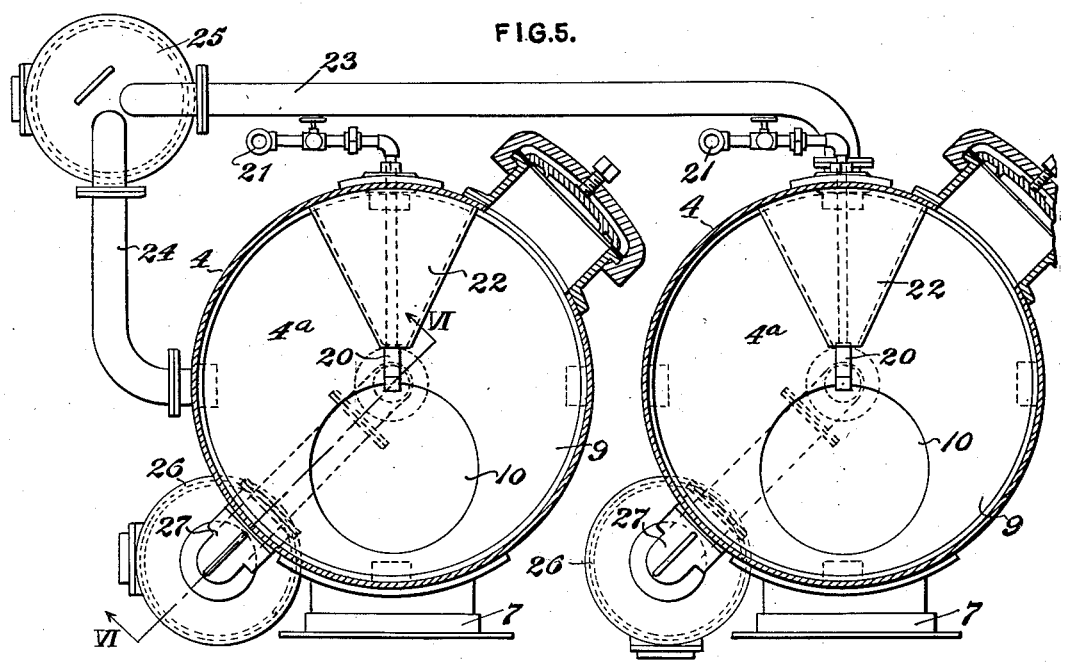

In the accompanying drawings, which illustrate an application of my invention, Figure 1 is a side elevational view of two gas washers embodying my invention; Fig. 2, a vertical sectional view of a gas washer constructed in accordance with my invention, the section being taken on line II—II of Fig. 1 looking in the direction of the arrows; Fig. 3, a horizontal sectional view taken on line III—III of Fig. 1; Fig. 4, a similar view taken on line IV—IV of Fig. 1; Fig. 5, a part sectional view and a part plan, the section being taken on line V—V of Fig. 1; Fig. 6, a part elevational and a part sectional view of apparatus connected with the lower end of the washer casing, the section being taken on line VI—VI of Fig. 5; and Fig. 7, an enlarged detail view of a spraying nozzle.

Referring to the drawings and as preferred, the gas washer comprises a metallic shell or casing preferably made up of a series of superimposed cylindrical sections 2, 3, and 4, with the lower section 4, as illustrated, located partially below the floor line 5.

Section 4 is provided with an inlet opening 7, into which the gas to be washed or scrubbed is introduced into the washer, and 8 designates the gas outlet extending from the upper section 2 of the washer.

From the foregoing, it will be noted that the inlet and outlet openings for the gas are arranged to provide for a passage of the gas through the washer in a vertical direction, but as hereinafter described, the course of travel of the gas through the washer is diverted and made to assume a zig-zag course.

Located near the upper end of the lower section 4, I provide a circular plate 9 provided with a circular opening 10 through which the gas passes from the section 4 into the section 3 of the washer.

In addition to the circular plate 9, which acts as a baffle for the upwardly passing gas, I provide further baffles 11 and 12 arranged within the casing and extending across the same. The intermediate baffle 11, as preferred, comprises an annular opening 13, and, as illustrated, this baffle 11 is made up of the annular ring 14 and a circular plate 15 supported by cross members 16 extending across the interior of the casing and secured to the walls thereof.

The baffle 12, as illustrated and as preferred, comprises a circular plate formed with a centrally disposed opening 17. The baffles 9, 11 and 12 divide the interior of the casing into four chambers or compartments $2^a$, $3^a$, $4^a$, and $5^a$.

Interposed between the respective baffles 9, 11 and 12, and between the baffle 12 and the top 18 of the washer, or located within the compartments $2^a$, $3^a$ and $4^a$, I provide horizontally disposed pipes 19, each pipe being connected up with a spraying nozzle 20. Pipes 19 respectively project through the walls of the casing and are connected with fluid supply pipes 21 arranged on the outside of the casing and diametrically opposite one another.

Positioned directly over each of the pipes 19, I provide a sector shaped plate 22, said plates 22 being designed for additional baffles. By the arrangement of the series of fluid supply pipes 19 with their respective spraying nozzles, I provide means whereby fluid may be introduced into the interior of the casing in the form of horizontally projected sprays through which the gas, during its zig-zag travel through the washer must pass.

The apparatus or gas washer illustrated is primarily designed for the extraction of oils, tars, ammonia, naphthalene, etc., from the gas during its travel from the main to the holder, and it is evident that I may employ any suitable liquid for effecting the horizontal sprays through which the gas is caused to pass, as for example, water and ammonical liquors.

In addition to the above, my invention is also applicable for use in connection with cleaning water-gas, as well as for other purposes where it is desired to pass a fluid through a horizontally projected fluid spray or a series of such sprays.

In the form of my invention, as illustrated by Fig. 1, I have shown two gas washers each respectively connected by means of pipes 23 and 24 to a water sealed receptacle 25 into which the foreign matter deposited on the surface of the water or immediately below the surface of the water or other liquid, which latter is maintained in the lower portion of the washer, may be conveyed.

Each of the washers is connected with a receptacle 26 by means of the pipe 27, whereby tar, etc., deposited in the lower portion of the gas washer is conveyed from said washer to the receptacle 26.

As particularly shown by Fig. 7, the spray-nozzles employed are impinging spray-nozzles having jet orifices *a* arranged directly opposite one another with the arms *b* thereof arranged to produce a horizontal spray by the impingement of the jets projected from the orifices *a*.

What I claim is:—

1. A gas washer comprising a casing provided with inlet and outlet openings arranged to direct gas vertically through the casing, of a plurality of alternately oppositely disposed spraying-nozzles within the casing adapted to project a series of sprays horizontally from opposite directions through which the gas passes during its travel through the casing, and baffles located within the casing for directing the gas in a tortuous path.

2. A gas washer comprising a casing provided with inlet and outlet openings arranged to direct gas vertically through the casing, a series of horizontally disposed fluid conducting pipes within the casing each provided with a spraying-nozzle, a sector shaped baffle plate located over the respective fluid conducting pipes.

3. A gas washer comprising a casing provided with inlet and outlet openings arranged to direct gas vertically through the casing, of a series of spraying-nozzles within the casing adapted to project a series of sprays horizontally through which the gas passes during its travel through the casing, sector shaped baffle plates arranged adjacent to the respective spraying-nozzles, and circular baffles located within the casing.

4. A gas washer comprising a casing provided with inlet and outlet openings arranged to direct gas vertically through the casing, a plurality of segmental baffle plates dividing the interior of the casing into a series of compartments, and a spraying-nozzle within a compartment adapted to project a spray horizontally through which the gas passes.

5. A gas washer comprising a casing having gas inlet and outlet openings, alternating baffles within the casing and projecting in opposite directions, and means comprising nozzles alternately disposed in opposite directions for introducing a fluid to the interior of the casing in the form of a spray through which the gas passes during its travel through the casing.

6. A gas washer comprising a casing having inlet and outlet openings, an impinging spray-nozzle arranged to project a spray through which the gas passes during its travel from the inlet to the outlet opening and baffles alternately disposed in opposite directions to direct the gas in a tortuous path past the spraying nozzle.

7. A gas washer comprising a casing provided with inlet and outlet openings arranged to direct gas vertically through the casing, a series of impinging spray-nozzles within the casing adapted to project a series of horizontal sprays through which the gas passes during its travel through the casing and sector shaped baffles alternately arranged within the casing to direct the gas in a tortuous path therethrough.

8. A gas washer comprising a casing provided with a gas inlet at one end and a gas outlet at the other end, a plurality of rows of spraying nozzles within the casing each nozzle of one row alternating with a nozzle of the other row, and baffles for directing the gas in a tortuous path.

9. A gas washer comprising a casing provided with a gas inlet at one end and a gas outlet at the other end, a plurality of rows of spraying nozzles within the casing each nozzle of one row alternating with a nozzle of the other row, and sector baffles for directing the gas in a tortuous path.

In testimony whereof I affix my signature in presence of two witnesses.

WILLARD B. OSBORNE.

Witnesses:
W. G. DOOLITTLE,
F. E. GAITHER.